June 18, 1929.  K. MÜLLER  1,718,173

PHOTOGRAPHIC SPRING CAMERA

Filed Jan. 25, 1927

Patented June 18, 1929.

1,718,173

UNITED STATES PATENT OFFICE.

KARL MÜLLER, OF FRANKFORT-ON-THE-MAIN-ENKHEIM, GERMANY.

PHOTOGRAPHIC SPRING CAMERA.

Application filed January 25, 1927, Serial No. 163,428, and in Germany January 26, 1926.

The invention relates to folding photographic cameras and has for its object to provide improvements in the construction of such cameras to enable them to be accommodated in a small space when not in use and to be quickly and easily expanded and set up into operative position when required.

According to the invention the camera is provided with a sliding or telescopic objective carrying an iconometer which is normally held folded upon the objective carrier by a catch which also holds the objective carried in the operative or collapsed position, the objective carrier being pushed forward and the iconometer moved to the operative position automatically by spring means when the catch is released.

An embodiment of the invention is shown, by way of example, in the accompanying drawing, in which:—

Figure 1:
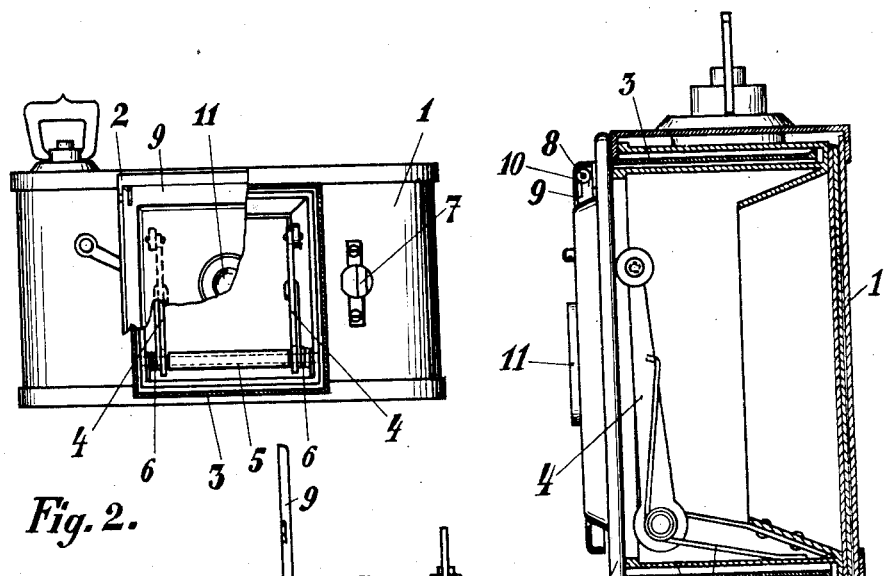
Fig. 1 shows the spring-camera in the closed position in elevation, partly in longitudinal section and on larger scale than in the other figures.
Figure 2:
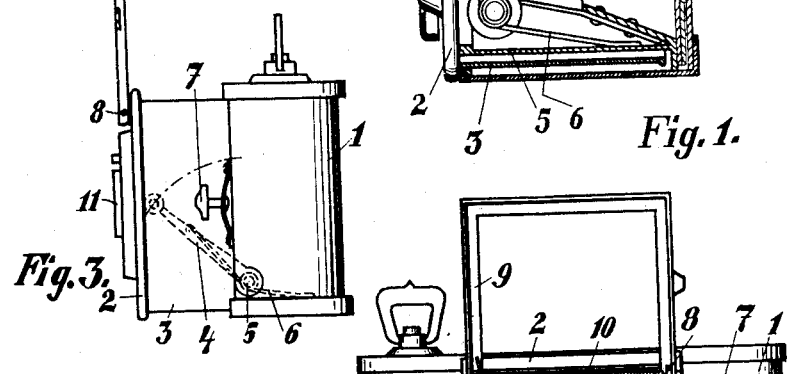
Fig. 2 shows the spring-camera in the closed position viewed from the front partly in section.
Figure 4:
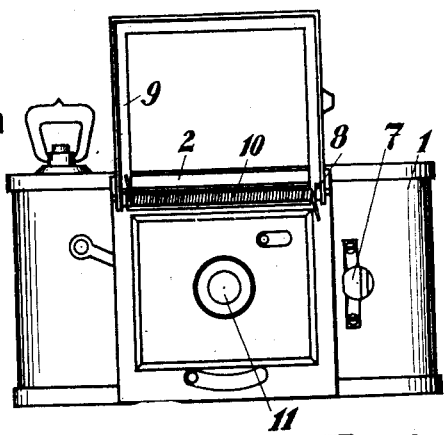
Fig. 4 is a view similar to Fig. 3 viewed from the front.
Figure 3:
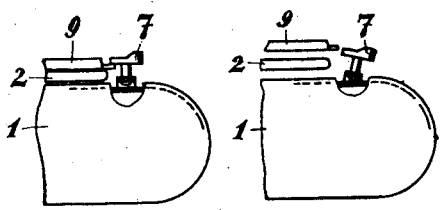
Fig. 3 shows the spring-camera in the working position viewed from the side.
Figures 5, 6:
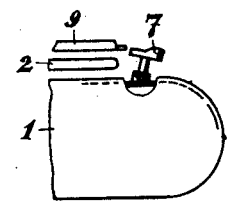
Fig. 5 shows on larger scale the locking of the folding parts of the camera and of the iconometer by means of a spring-catch in closed position.
Fig. 6 is a view, similar to Fig. 5 showing the elements in the opened position.

The spring-camera consists of a film box 1 in which the film bobbin and the winding up roll are arranged between which the film strip is stretched for exposure. The objective carrier 2 is extended at the rear by a tubular body 3 of resisting material as for instance sheet iron and which is guided in the film box 1 perpendicularly to the film band. Onto the inner wall of the objective carrier 2 rests the free end of an arm 4 pivotable around an axle 5. To the axle 5 of arm 4 a turning moment is communicated by a spring 6 which has the tendency to bring the arm 4 from the position shown in Fig. 1 into the position shown in Fig. 3. By means of a catch 7 the objective carrier 2 is locked on the film box 1 so that the several elements described are held by the catch in the position shown in Figs. 1 and 2. On the upper edge of the objective carrier 2 a frame is hingedly mounted by means of a hinge 8 said frame serving as iconometer. On the axle of the hinge 8 a spring 10 is arranged which, in a similar manner as spring 6, has the tendency to bring the frame 9 into the position shown in Figs. 3 and 4. When the frame 9 has, however, been turned around the hinge 8 and laid upon the objective carrier 2, the catch 7 grips over the frame 9 and holds at the same time this frame 9 and the objective carrier 2 in the closed position shown in Figs. 1 and 2. As soon as the catch 7 has been released, the tubular body 3 is pushed forward by the action of the spring-controlled arm 4 and the iconometer frame 9 is oscillated around the hinge 8 from the position shown in Figs. 1 and 2 into the position shown in Figs. 3 and 4. The free length of the tubular body 3 is selected so that the objective 11 is adjusted to "infinite" in the advanced position shown in Figs. 3 and 4.

In order to provide a good and simple guiding for the tubular body 3, it is advisable to limit the inner cross section of the tubular body 3. A square cross section of the tubular body of about 10 square centimeters is practical, but in the same manner cameras of such sizes can be constructed, in which the outer cross section for the tubular body 3 is up to 50 square centimeters. The smallness of the cross section presents, however, just the advantage to produce the spring-camera with the simple means of a shiftable tubular body 3 which makes it possible to bring the objective 11 as well as the iconometer frame 9 by quite simple means into the operative position after the releasing of the catch.

I claim:—

1. A photographic spring-camera comprising in combination, a film box, a film bobbin and a winding up roll in said film box, so that the film band is stretched in vertical direction, a tubular body substantially rigid, movably mounted in the front wall of said film box the cross section of said tubular body being not more than 50 square centimeters, an objective board fixed on the front end of said tubular body, a spring controlled oscillatable arm in said film box and bearing onto the inner surface of said objective board, a catch on the outer end of said film box for securely holding said objective board and said tubular body in said film box so that when said catch is released said objective board and tubular body are pushed out of said film box perpendicularly to said film band into the "infinite" position of the objective, an iconometer frame on the top end of said objective board, a hinge for hingedly fixing said iconometer frame on said objective board, and a spring in said hinge for raising said iconometer frame into the vertical position when said objective board is pushed forward from said film box.

2. A photographic spring-camera comprising in combination, a film box, a film bobbin and a winding up roll in said film box, so that the film band is stretched in vertical direction, a tubular body substantially rigid, movably mounted in the front wall of said film box the cross section of said tubular body being not more than 50 square centimeters, an objective board fixed on the front end of said tubular body, a spring controlled oscillatable arm in said film box and bearing onto the inner surface of said objective board, a catch on the outer end of said film box for securely holding said objective board and said tubular body in said film box so that when said catch is released said objective board and tubular body are pushed out of said film box perpendicularly to said film band into the "infinite" position of the objective, an iconometer frame on the top end of said objective board held by said catch in the position of rest so that it is lying flat on said objective board, a hinge for hingedly fixing said iconometer frame on said objective board, and a spring in said hinge for raising said iconometer frame into the vertical position when said catch releases said iconometer frame and said objective board.

In testimony whereof I affix my signature.

KARL MÜLLER.